United States Patent
Knopf et al.

(10) Patent No.: US 8,894,156 B2
(45) Date of Patent: Nov. 25, 2014

(54) CONNECTION OF A FLANGED RING OF A HUB BEARING UNIT TO A MOTOR VEHICLE WHEEL OR SUSPENSION STANDARD OF A MOTOR VEHICLE

(75) Inventors: Andreas Knopf, Würzburg (GE); Paolo Re, Nichelino (IT)

(73) Assignee: Aktiebolaget SKF, Gothenburg (SE)

( * ) Notice: Subject to any disclaimer, the term of this patent is extended or adjusted under 35 U.S.C. 154(b) by 330 days.

(21) Appl. No.: 13/324,178

(22) Filed: Dec. 13, 2011

(65) Prior Publication Data
US 2012/0161501 A1 Jun. 28, 2012

(30) Foreign Application Priority Data
Dec. 27, 2010 (IT) .......................... TO2010A001064

(51) Int. Cl.
*B60B 27/00* (2006.01)
*F16C 33/60* (2006.01)

(52) U.S. Cl.
CPC ........... *B60B 27/001* (2013.01); *B60B 27/0005* (2013.01); *F16C 33/60* (2013.01); *Y02T 10/86* (2013.01)
USPC ..................... 301/109; 301/105.1; 301/35.621

(58) Field of Classification Search
CPC .... B60B 27/00; B60B 27/02; B60B 27/0005; B60B 27/001; B60B 3/16
USPC .............. 301/35.621, 35.623, 35.625, 105.1, 301/109, 110; 384/544; 29/894.361; 411/974, 984, 985
See application file for complete search history.

(56) References Cited

U.S. PATENT DOCUMENTS

| | | | | |
|---|---|---|---|---|
| 2,053,478 A | * | 9/1936 | Horton | 403/274 |
| 2,352,487 A | * | 6/1944 | McNamara, Jr. | 301/9.1 |
| 2,877,054 A | * | 3/1959 | Hedlund et al. | 301/35.625 |
| 5,645,386 A | * | 7/1997 | Damm et al. | 411/412 |
| 2001/0016520 A1 | * | 8/2001 | Sahashi et al. | 464/182 |
| 2004/0121847 A1 | * | 6/2004 | Fukushima et al. | 464/178 |
| 2007/0204461 A1 | * | 9/2007 | Nishiki et al. | 29/894.361 |
| 2008/0031556 A1 | * | 2/2008 | Heim et al. | 384/448 |

FOREIGN PATENT DOCUMENTS

| | | |
|---|---|---|
| DE | 19625343 C1 | 9/1997 |
| DE | 102004044118 A1 | 3/2006 |
| EP | 1288021 A2 | 3/2003 |
| GB | 725393 A * | 3/1955 |
| JP | 2001191715 A * | 7/2001 |
| WO | WO2010063299 A1 | 6/2010 |

* cited by examiner

*Primary Examiner* — Kip T Kotter
(74) *Attorney, Agent, or Firm* — Bryan Peckjian; SKF USA Inc. Patent Department

(57) ABSTRACT

A hub bearing assembly for a motor vehicle wheel comprises a flanged ring and a set of pin connection elements. The flanged ring defines a central axis of rotation and comprises a tubular core made of steel and an outer flange of light metallic material having axial bores formed therethrough. Each pin connection element includes a head portion and an axial cylindrical shank defining a respective longitudinal axis parallel to the axis of rotation and is accommodated in one of the bores, and a threaded cylindrical surface for connecting the flanged ring to a wheel or to a suspension standard of the vehicle. Each head portion is shaped differently from that of a solid of revolution generated about the longitudinal axis of the shank portion. Each head portion is accommodated in a respective recess of corresponding shape, formed in one of the two radial opposite faces of the flange.

11 Claims, 4 Drawing Sheets

CONNECTION OF A FLANGED RING OF A HUB BEARING UNIT TO A MOTOR VEHICLE WHEEL OR SUSPENSION STANDARD OF A MOTOR VEHICLE

CROSS-REFERENCE TO RELATED APPLICATION

This United States Non-Provisional Utility application claims the benefit of co-pending Italian Patent Application Serial No. TO2010A00105, filed on 27 Dec. 2010, which is incorporated herein in its entirety.

FIELD OF THE INVENTION

The present invention relates to a connecting element for connecting a flanged ring of a hub-bearing unit to a wheel or a suspension standard of a motor vehicle. The invention further relates to a hub bearing assembly comprising the said connecting element.

BACKGROUND OF THE INVENTION

In order to mount a wheel on the hub of a motor vehicle, bolted connections are conventionally used. In the procedures most commonly used at the present time, threaded bores are conventionally provided in the flange of the hub and through bores are formed in the wheel for the purpose of fixing the wheel to the radial flange of the hub; the wheel, a flange of the brake rotor and the radial flange of the hub are placed axially adjacently to each other, and a set of corresponding bolts is inserted into the aligned bores of these three elements, the bolts being screwed tightly into the threaded bores of the hub.

According to another conventional arrangement, threaded nuts are used. The wheel, the flange of the brake rotor and the radial flange of the hub are placed axially adjacently to each other, and the bores in these components are aligned. Four or five screws are inserted from the axially inner (or "inboard") side of the flange of the hub. Each screw has a head and a shank having a terminal threaded portion and an axially knurled portion near the head. The screws are force-fitted with radial interference into the circular axial bores formed in the radial flange of the hub. When the screws have been fitted, the rotor and then the wheel are fitted onto the terminal parts of the shanks of the screws from the outside, and finally outer nuts are screwed on with a specified tightening torque. The knurling serves to fix the screws to the flange of the hub with respect to rotation, enabling the specified tightening torque to be applied correctly.

In the motor vehicle industry there is an increasing demand for the reduction of the weight of vehicle components, with the aim of reducing fuel consumption and exhaust emissions. In order to reduce the overall weight of the wheel, and particularly of the rotating mass, the flange of the hub can be partially made of a material which is lighter than the steel forming the central part or tubular core of the hub. Typically, the flange can be made of light metal alloys (such as aluminium, titanium or magnesium alloys), metal matrix composites, polymers, or fibre-reinforced polymers. The core of the hub is made of a high toughness metallic material such as bearing steel or low-carbon steel. The connection between the core of the hub and the lighter flange can be provided, alternatively, by means of a positive connection, or by overmoulding, for example by a semi-solid casting process.

It is known that the aforesaid light materials generally have lower mechanical strength than the steel, which is conventionally used.

The heads of the screws exert axial stresses directly on the areas surrounding the bores on the inboard face of the hub flange. This causes a concentration of high stresses on small surface areas. If axial knurling is provided on the screws, the connection of the screws to the hub flange is found to be insufficiently strong if the material of the flange is less hard than steel, or if the material of the flange has a higher coefficient of thermal expansion than the fastening screw. In these circumstances, the rotation of the screws with respect to the flange in which they are accommodated can be avoided by providing mutual non-circular form engagement between the screws and the bores of the flange. However, this requires special machining operations on the flange and screws in order to create a specific shape, which increases production costs.

To compensate for the lower mechanical strength of light materials, these materials are used in combination with tubular steel inserts, which are incorporated in the flange or fixed to it in some other way. These inserts, distributed at angular intervals in the flange, are used to create the threaded surfaces of the bores into which the screws are subsequently screwed, the threaded shanks of the screws protruding at least partially from the outboard side of the flange, that is to say the surface facing towards the axially outer (or "outboard") side. Alternatively, the tubular inserts can be retained axially and rotationally by means of an outer thread, or a forced radial coupling, using one or more axial ribs or grooves on the outer cylindrical surface of each insert. Axial retention is also provided by a shoulder formed at the axially inner end of the insert, which is adapted to bear against the axially inner face of the hub flange.

The tubular inserts can be assembled onto the flange after the forming of the latter, or can be placed in the mould before the moulding operation, which forms the hub flange. In the latter case, the flow of plastic material in the moulding cavity is not sufficient to ensure the good structural quality of the portions of the flange located around the insert. In particular, an imperfect flow of plastic material causes incomplete filling of the areas downstream of the inserts, with respect to the direction of the flow of material in the mould.

If the inserts are positioned after casting, externally threaded inserts are normally used. This usually requires the forming of a pre-threaded bore in the flange, or the use of externally self-tapping inserts, which are locked in the flange during insertion. Self-tapping inserts and the operations for their insertion require considerable expenditure. The axial retention is developed locally at the insert/flange interface, and gives rise to concentrated high stresses. This also occurs in the case of force-fitted inserts which each have one or more axial ribs on their outer cylindrical surfaces, for the purpose of preventing rotation of the insert with respect to the flange.

Similar arrangements to those discussed above are used to connect the outer flanged ring of a hub-bearing unit to the suspension standard of a motor vehicle.

SUMMARY OF THE INVENTION

A general object of the invention is to improve the mounting and locking of a hub bearing unit having a flange of light material onto a wheel or onto a standard of the suspension. More specifically, an object is to provide a stable and precise threaded connection, to simplify the positioning of the threaded elements for fastening to the wheel or to the standard, and to optimize the distribution of stresses in the flange. Another object is to prevent the rotation of the threaded fixing elements with respect to the flange in the course of tightening and unscrewing.

These and other objects and advantages, which will be understood more fully below, are achieved according to the hub bearing assembly disclosed herein. Enhanced embodiments of the invention are defined in the dependent claims, the content of which is to be considered as an integral part of the present description.

BRIEF DESCRIPTION OF THE DRAWINGS

Some preferred, but non-limiting, embodiments of the invention will now be described, with reference to the attached drawings, in which.

DETAILED DESCRIPTION OF THE INVENTION

Figure 1:
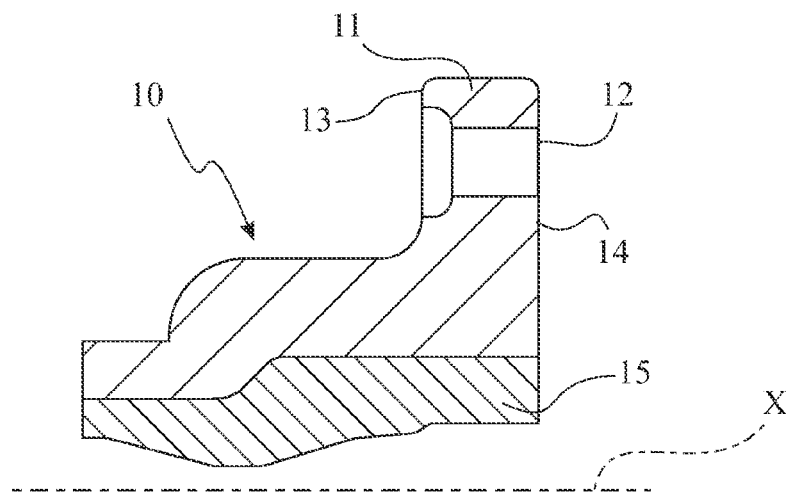
FIG. 1 is a partial view, in axial section, of a flanged ring forming part of a hub assembly in one embodiment of the invention.

With initial reference to FIG. 1, the number 10 indicates a flanged ring forming part of a hub-bearing unit (not shown). The ring 10 defines a central axis of rotation X and is designed to be used either as the rotatable ring which is connected to the vehicle wheel, or as the stationary ring which is connected to the suspension standard. For this connection, the ring 10 is provided with a flange 11, which extends in a radially outward direction and has four or five parallel axial through bores 12 formed in it at angularly equally spaced positions around the axis X.

Throughout the present description and the claims, any terms and expressions indicating positions and directions, such as "radial" and "axial", are to be understood as referring to the axis of rotation X of the hub-bearing unit. On the other hand, expressions such as "axially inner" (or "inboard") and "axially outer" (or "outboard") refer to the mounted condition on the vehicle. In the following description, reference is made to an exemplary application in which the ring 10 is the radially outer rotatable ring of a hub-bearing unit, and the flange 11 is fixed to the wheel. Those skilled in the art will understand that the expressions "axially inner" and "axially outer" must be interchanged with each other in different applications (for example, if the ring 10 is fixed to the standard).

The bores 12 extend through the flange 11 between an axially inner radial face 13, which faces the vehicle when in use, and an axially outer radial face 14, forming a flat support surface for a brake rotor (not shown) and/or for the wheel to be connected to the hub 10, or for the suspension standard (not shown).

The flange 11 is made, at least partially, of a material defined herein as "light", which is preferably selected among the following: light metal alloys (such as aluminium, titanium or magnesium alloys), metal matrix composites, polymers, and fibre reinforced polymers.

The flange 11 is connected integrally and rigidly to a central portion 15 of the hub in the form of a substantially tubular core, illustrated only in part, which is made of a high toughness metallic material such as steel, preferably bearing steel or low-carbon steel. The methods of connecting the steel core or central portion 15 to the light flange 11 are known in the art and are therefore not discussed here. Suffice it here to mention that the flange 11 of light material is connected to the core 15 preferably by overmoulding or casting, or by a positive connection with radial interference.

The through bores 12 can partially accommodate a corresponding plurality of pin connection elements 20 (FIG. 2) which can be used for fastening to the wheel or to the suspension standard.

Each pin element 20 has an axial cylindrical shank portion 21 and a head portion 22. The shank portion 21 defines a corresponding longitudinal axis Y parallel to the axis of rotation X of the hub, and is accommodated at least partially in one of the bores 12 of the flange. The shape of the head portion 22 is different from that of a solid of revolution generated about the longitudinal axis Y of the shank portion 21. Each head portion is accommodated in a respective recess 16 (FIG. 3) of corresponding shape, formed in one of the two radial opposite faces of the flange 11 of the hub. Each of the recesses 16 forms an enlargement of one of the through bores 12, at the end where the bores open on the radial face 13 of the flange 11. The Y-axis coincides with the central axes of the bores 12.

The shank portion 21 has a cylindrical threaded surface 24, which serves to connect the flanged ring 10 to a wheel or to a suspension standard of a motor vehicle. In the example in FIG. 2, the threaded surface 24 is formed on an outer cylindrical surface of the shank portion 21. In the assembled condition (FIG. 5), the threaded surface or portion 24 protrudes axially beyond the radial axial end face 14 of the flanged ring. A threaded nut (not shown) is then tightened onto the threaded portion 24, to connect the hub to the wheel or to the suspension.

The positive connection between the recesses 16 and the head portions 22 prevents the pin elements 20 from rotating with respect to the flange 11, without generating high concentrated stresses in the flange, which would be particularly harmful in the light material composing the flange. The pin elements are advantageously made of cold pressed iron or steel.

In one embodiment, the shank portions 21 each have a non-threaded portion 25 (FIG. 2), which is intermediate between the threaded portion 24 and the head 22. The pin element 20 can be fixed to the flange 11 with radial interference between the outer cylindrical surfaces 25, which are preferably smooth, of the shank portions 21 and the cylindrical bores 12 of the flange.

Figure 6:
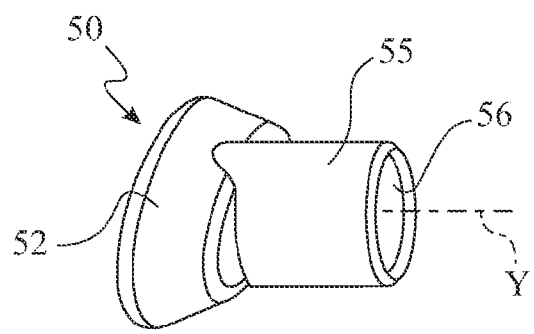
FIG. 6 is a schematic perspective view of a further embodiment of a pin connection element.
Figure 7:
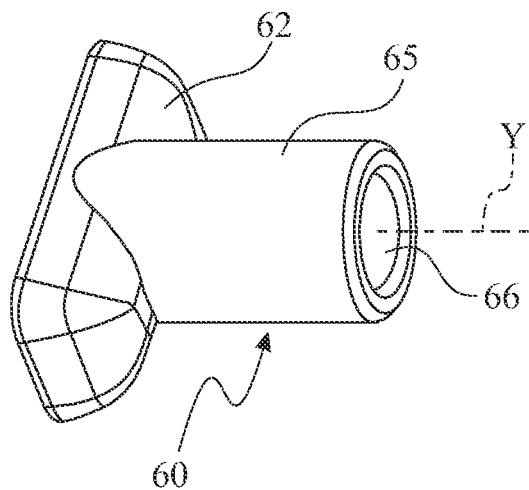
FIG. 7 is a schematic perspective view of a variant of the pin connection element of FIG. 6.
Figure 8:
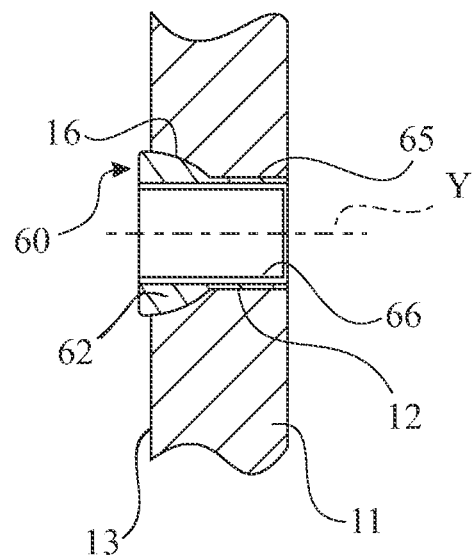
FIG. 8 is a partial view, in axial section, of a pin connection element such as that of FIG. 6 or FIG. 7, connected to a flanged ring as shown in FIG. 3.

According to the embodiments 40, 50 shown in FIGS. 6 through 8, each of the shank portions 41, 51 has an axial through bore passing through it, this bore having the threaded surface 46, 56 for accommodating a conventional screw (not shown) to enable the flanged ring to be fastened to the wheel or to the suspension standard. As shown in FIG. 8, the hollow shank portion 51 must not protrude axially beyond the terminal radial face 14 of the flange, which must provide a precise support surface, perfectly perpendicular to the axis of rotation X, for the wheel and the brake rotor, or for the suspension standard.

Figure 2:
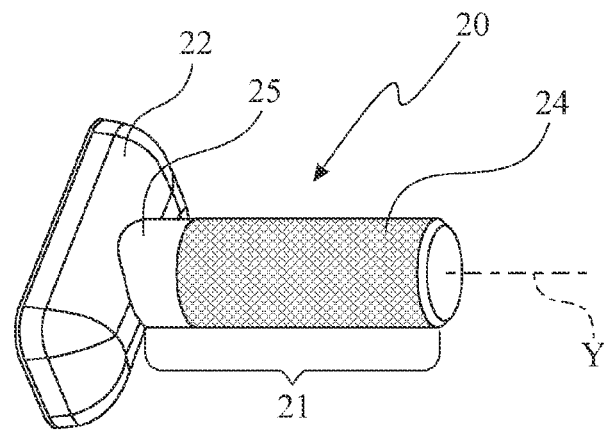
FIG. 2 is a schematic perspective view of one embodiment of a pin connection element.
Figure 3:
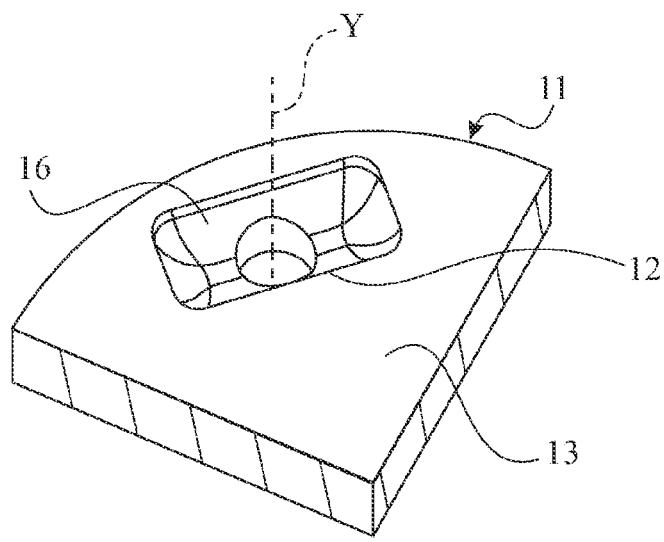
FIG. 3 is a partial perspective view of the flanged ring of FIG. 1.
Figure 4:
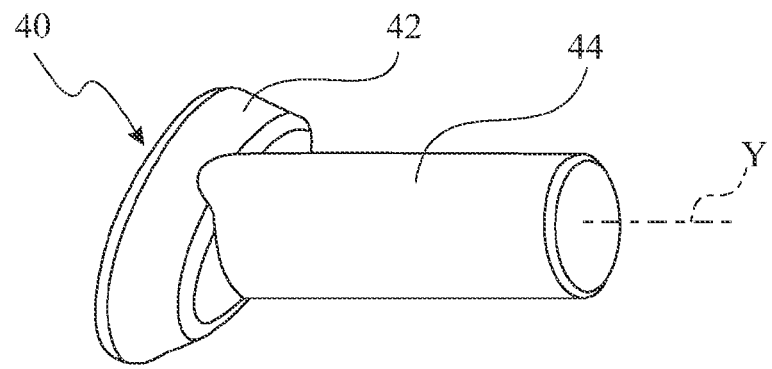
FIG. 4 is a schematic perspective view of a variant of the pin element of FIG. 2.
Figure 5:
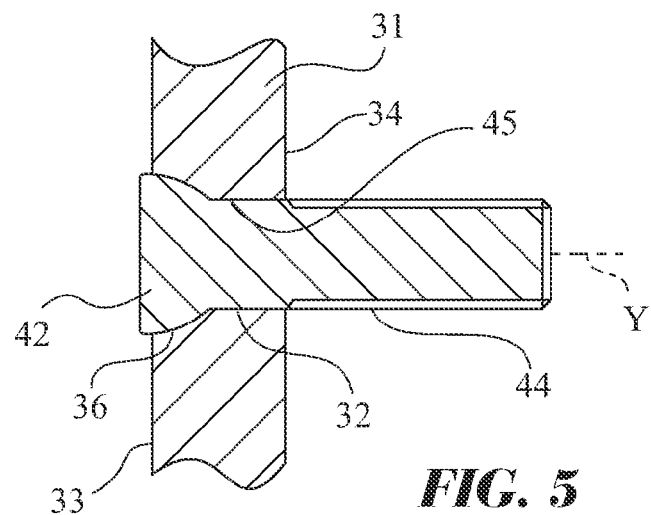
FIG. 5 is a partial view, in axial section, of a pin element such as that of FIG. 2 (or FIG. 4) connected to a flanged ring as shown in FIG. 3.

The pin elements 20, 50 of FIGS. 2 and 7 each have a respective head portion 22, 52 in the form of a parallelepiped which is bevelled or has rounded or bevelled corners, designed to be accommodated in the recess 16 of corresponding shape provided in the face 13 of the flange 11 (FIG. 3). The rounded corners are advantageous because they limit the maximum level of the concentrated stresses. The head portion can be made in virtually any shape, which does not coincide with that of a solid of revolution about the longitudinal axis Y of the pin element concerned and of the relevant bore 12. For example, in FIG. 4 the head portion 42 of the pin element 40 has an oval contour. FIG. 5 shows the pin element 40 of FIG. 4 connected to a flange 31 such as that of FIG. 3. FIG. 6 shows a pin element 50 with an axial through threaded cavity 56 and a head portion 52 with an oval contour. The outer cylindrical surface 55 is smooth. In FIG. 7, the head portion 62 has a polygonal contour with bevelled corners; the outer cylindrical surface 65 of the shank portion 61 is smooth, while the surface 66 of the inner axial cavity is threaded. The threads 56, 66 lie in a plane generally parallel to a radial plane of the flange 11, 71.

Figure 9:
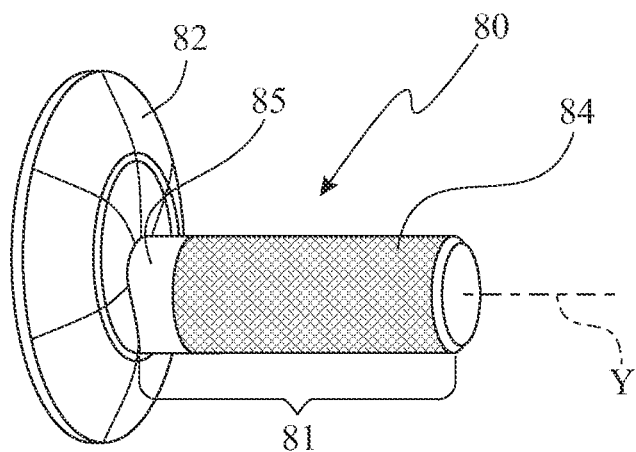
FIG. 9 is a schematic perspective view of another embodiment of a pin connection element.
Figure 10:
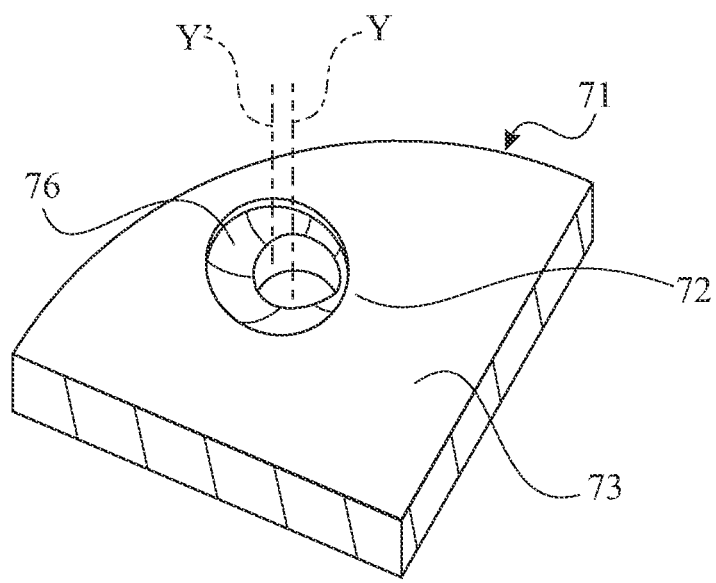
FIG. 10 is a partial perspective view of another embodiment of a flanged ring.

In other embodiments 80, the head portions 82 of the pin elements 80 can be made in other shapes, including shapes, which are solids of revolution, provided that they are generated by revolution about an axis, which does not coincide with the longitudinal axis Y of the relevant shank portion, as illustrated in the exemplary embodiment of FIG. 9, with an exemplary mating recess 76 illustrated in FIG. 10. The exemplary embodiment illustrated includes the head portion 82 and the corresponding recess 76 comprising circular contours eccentric to the longitudinal axes of the relevant shank portions. Generally, the enlarged and/or elongate shape of the head portion provides a wide interface surface, which distributes the loads over an extended contact area, thus eliminating the peak stresses.

Although certain exemplary embodiments have been illustrated in the detailed description above, it should be understood that many variants are possible. It should also be understood that the illustrated embodiments are purely exemplary and are not to be interpreted as limiting in terms of the scope, application or configuration. The drawings and the above detailed description will provide persons skilled in the art with a convenient guide to the application of the invention, but it is to be understood that various changes may be made to the functions and configuration of the elements, as described with regard to the exemplary embodiments, without departing from the scope of the invention as defined in the appended claims and their legal equivalents.

REFERENCE ELEMENTS DESCRIPTIONS 10 flanged ring forming part of a hub-bearing unit
11 flange
12 parallel axial through bores
13 axially inner radial face
14 axially outer radial face
15 central portion of the hub in the form of a substantially tubular core
16 head receiving recess formed in flanged ring
20 pin element
21 shank portion
22 head
24 threaded portion
25 outer cylindrical surface
30 flanged ring forming part of a hub-bearing unit
31 flange
32 parallel axial through bores
33 axially inner radial face
34 axially outer radial face
36 head receiving recess formed in flanged ring
40 pin element
42 head
44 threaded portion
45 outer cylindrical surface
50 pin element
52 head
55 outer cylindrical surface
56 threaded bore portion
60 pin element
62 head
65 outer cylindrical surface
66 threaded bore portion
71 flange
72 parallel axial through bores
73 axially inner radial face
76 head receiving recess formed in flanged ring
80 pin element
81 shank portion
82 head
84 threaded portion
85 outer cylindrical surface
X central axis of rotation
Y longitudinal axis of the relevant shank portion

What we claim is:

1. A hub-bearing assembly for a motor vehicle wheel, the assembly comprising:
    a flanged ring defining a central axis of rotation, with
        a tubular core made of a first high toughness metallic material, and
        a flange extending in a radially outer direction, wherein the flange is made of a second material lighter than the first material, is integral with the core, and provides a plurality of axial through bores at angularly equally spaced positions around the axis;
    a corresponding plurality of pin connection elements, each pin connection element having:
        an axially extending cylindrical shank portion, which defines a respective longitudinal axis parallel to the rotation axis and is at least partially accommodated in one of the bores,
        a head portion,
        a cylindrical threaded surface for connecting the flanged ring to a wheel or a suspension standard of a motor vehicle, and
        an axial through bore, coaxially inside the respective shank portion, in which bore the respective cylindrical threaded surface is formed;
    the hub bearing assembly being characterized in that said head portions each have a shape different from that of a solid of revolution generated about the longitudinal axis of the relevant shank portion, and in that each head portion is accommodated in a correspondingly shaped respective recess formed in one of the two radial opposite faces of the flange, and wherein each recess embraces the area where a respective one of the through bores opens onto the radial face of the flange.

2. A hub-bearing assembly as recited in claim 1, wherein the first metallic material composing the tubular core is bearing steel or low-carbon steel, and that the second material composing the flange is selected from the following materials: aluminium alloys, titanium alloys, magnesium alloys, metal matrix composites, polymers, and fibre reinforced polymers.

3. A hub-bearing assembly as recited in claim 1, wherein the pin connection elements are made of a ferrous material.

4. A hub-bearing assembly as recited in claim 3, wherein the pin connection elements are made of steel or cold-pressed iron.

5. A hub-bearing assembly as recited in claim 1, the head portions and the corresponding recesses further comprise contours that are elongate in at least one direction lying in a radial plane.

6. A hub-bearing assembly as recited in claim 5, the head portions and the corresponding recesses further comprise oval contours.

7. A hub-bearing assembly as recited in claim 1, the head portions and the corresponding recesses further comprise polygonal contours with rounded or bevelled corners.

8. A hub-bearing assembly as recited in claim 1, the head portions and the corresponding recesses further comprise a parallelepiped shape with rounded or bevelled corners.

9. A hub-bearing assembly as recited in claim 1, the head portions and the corresponding recesses further comprise circular contours eccentric to the longitudinal axes of the relevant shank portions.

10. A hub-bearing assembly as recited in claim 1, wherein the head portions are one of transversely enlarged and elongated with respect to the relevant shank portions.

11. A hub-bearing assembly as recited in claim 1, the shank portions further comprise at least one section with a smooth outer cylindrical surface adjacent to the head portion.

\* \* \* \* \*